US012334103B2

(12) United States Patent
Mensah et al.

(10) Patent No.: US 12,334,103 B2
(45) Date of Patent: Jun. 17, 2025

(54) DOOR KNOCK ACCESS CONTROL

(71) Applicant: Alarm.com Incorporated, Tysons, VA (US)

(72) Inventors: William Wireko Mensah, Fairfax, VA (US); Daniel John Koniar, Bloomington, MN (US); Liyu Yao, McLean, VA (US); Martin Logan Elliott, Frederick, MD (US); John Zhang, Chicago, IL (US)

(73) Assignee: Alarm.com Incorporated, Tysons, VA (US)

( * ) Notice: Subject to any disclaimer, the term of this patent is extended or adjusted under 35 U.S.C. 154(b) by 129 days.

(21) Appl. No.: 17/137,957

(22) Filed: Dec. 30, 2020

(65) Prior Publication Data

US 2021/0217438 A1 Jul. 15, 2021

Related U.S. Application Data

(60) Provisional application No. 62/960,392, filed on Jan. 13, 2020.

(51) Int. Cl.
*G10L 25/51* (2013.01)

(52) U.S. Cl.
CPC .................................... *G10L 25/51* (2013.01)

(58) Field of Classification Search
CPC ........................................................ G10L 25/51
See application file for complete search history.

(56) References Cited

U.S. PATENT DOCUMENTS

| | | | |
|---|---|---|---|
| 7,971,156 B2 | 6/2011 | Albertson et al. | |
| 9,159,217 B1 | 10/2015 | Logan et al. | |
| 9,447,609 B2 | 9/2016 | Johnson et al. | |
| 9,691,198 B2 | 6/2017 | Cheng et al. | |
| 10,184,272 B2 | 1/2019 | Lee | |
| 10,635,907 B2 | 4/2020 | Child et al. | |
| 2010/0141381 A1* | 6/2010 | Bliding | G07C 9/00309 340/5.61 |
| 2018/0144615 A1* | 5/2018 | Kinney | G08B 13/1965 |
| 2018/0239435 A1* | 8/2018 | Ashoori | G06F 1/1694 |
| 2018/0293981 A1* | 10/2018 | Ni | G10L 15/08 |
| 2018/0325470 A1* | 11/2018 | Fountaine | G08B 21/0446 |
| 2018/0376108 A1* | 12/2018 | Bright-Thomas | G06V 20/40 |

(Continued)

*Primary Examiner* — Richemond Dorvil
*Assistant Examiner* — Ethan Daniel Kim
(74) *Attorney, Agent, or Firm* — Fish & Richardson P.C.

(57) ABSTRACT

Methods, systems, and apparatus for door knock access control are disclosed. A monitoring system for monitoring a property includes: a proximity sensor located at a door of the property; a microphone that is configured to detect sound within an area near the door and generate audio data that represents the detected sound; and a monitor control unit configured to perform operations including: receiving, from the proximity sensor, proximity data indicating an object positioned within a set proximity to the door; based on receiving the proximity data, activating the microphone; receiving, from the microphone, the audio data; determining that a similarity between the audio data and stored audio data representing a knocking pattern satisfies similarity criteria; and in response to determining that the similarity between the audio data and the stored audio data satisfies similarity criteria, performing a monitoring system action.

20 Claims, 4 Drawing Sheets

(56) References Cited

U.S. PATENT DOCUMENTS

| | | | | |
|---|---|---|---|---|
| 2019/0089934 | A1 * | 3/2019 | Goulden | G08B 7/06 |
| 2019/0130687 | A1 | 5/2019 | Johnson | |
| 2022/0139371 | A1 * | 5/2022 | Sharifi | G10L 15/01 |

* cited by examiner

DOOR KNOCK ACCESS CONTROL

CROSS-REFERENCE TO RELATED APPLICATIONS

This application claims the benefit of the U.S. Provisional Patent Application No. 62/960,392 filed Jan. 13, 2020, which is incorporated herein by reference in its entirety.

TECHNICAL FIELD

This disclosure application relates generally to property monitoring systems with smart locks.

BACKGROUND

This disclosure application relates generally to property monitoring systems with smart locks. Many properties are equipped with monitoring systems that include sensors and connected system components. Some monitoring systems include smart door locks that may be operated remotely or through a keypad.

SUMMARY

Techniques are described for door knock access control. A door knock access control system can authenticate access codes for a smart lock by first analyzing sound captured from door knocks. The system can compare acoustic signatures of the door knocks to acoustics signatures of pre-programmed knocks. Once the system finds a match, the system can allow a user to enter access codes into the smart lock to gain entry to a property. Many residents and homeowners equip their properties with monitoring systems to enhance the security, safety, or convenience of their properties. The property monitoring systems can include knock-sensing locks, which can control access to the property based on detecting knocking on a door to a property.

Monitoring systems can include smart locks. A smart lock can enable locking and unlocking of a door through operation of a keypad and/or through remote control. Door knock detection sensors can be incorporated into a smart lock to construct a knock-sensing lock. Door knock detection sensors can include, for example, microphones and vibration sensors that can detect a person knocking on the door. Door knock detection sensors can include additional sensors, e.g., proximity sensors, to confirm the door knock by detecting that a person is approaching the door.

The knock-sensing lock can detect knocking patterns of a door knock. Knocking patterns can include, for example, a number of knocks, a knocking volume, and a time between knocks. The monitoring system can compare detected knocking patterns to stored knocking patterns. The stored knocking patterns can be pre-recorded by a resident or owner of the property. The monitoring system can determine a matching percentage between detected knocking patterns and stored knocking patterns. Based on determining that the matching percentage exceeds a matching threshold, the monitoring system can classify the detected knocking pattern as a "Match."

Monitoring systems can dynamically control and configure devices and components of a property based on the matching of a door knock. For example, the monitoring system can enable door access by activating the keypad in response to detecting a knocking pattern that matches a stored knocking pattern. In some examples, in response to detecting a match, the monitoring system can perform actions such as sending a notification to a resident, or turning on a porch light.

Door knock access control can provide an additional layer of security for controlling access to a property. For example, in an event where a system's user code is compromised, an intruder will not be able to access the property without knowing a correct knocking pattern. Additionally, knocking patterns are more difficult to guess than access codes. An intruder may be able to guess a numerical access code based on knowing, for example, a resident's birthday. The intruder is less likely to be able to guess a unique knocking pattern. Therefore, by adding a requirement of performing the unique knocking pattern, the property monitoring system can deny the intruder access to the property.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
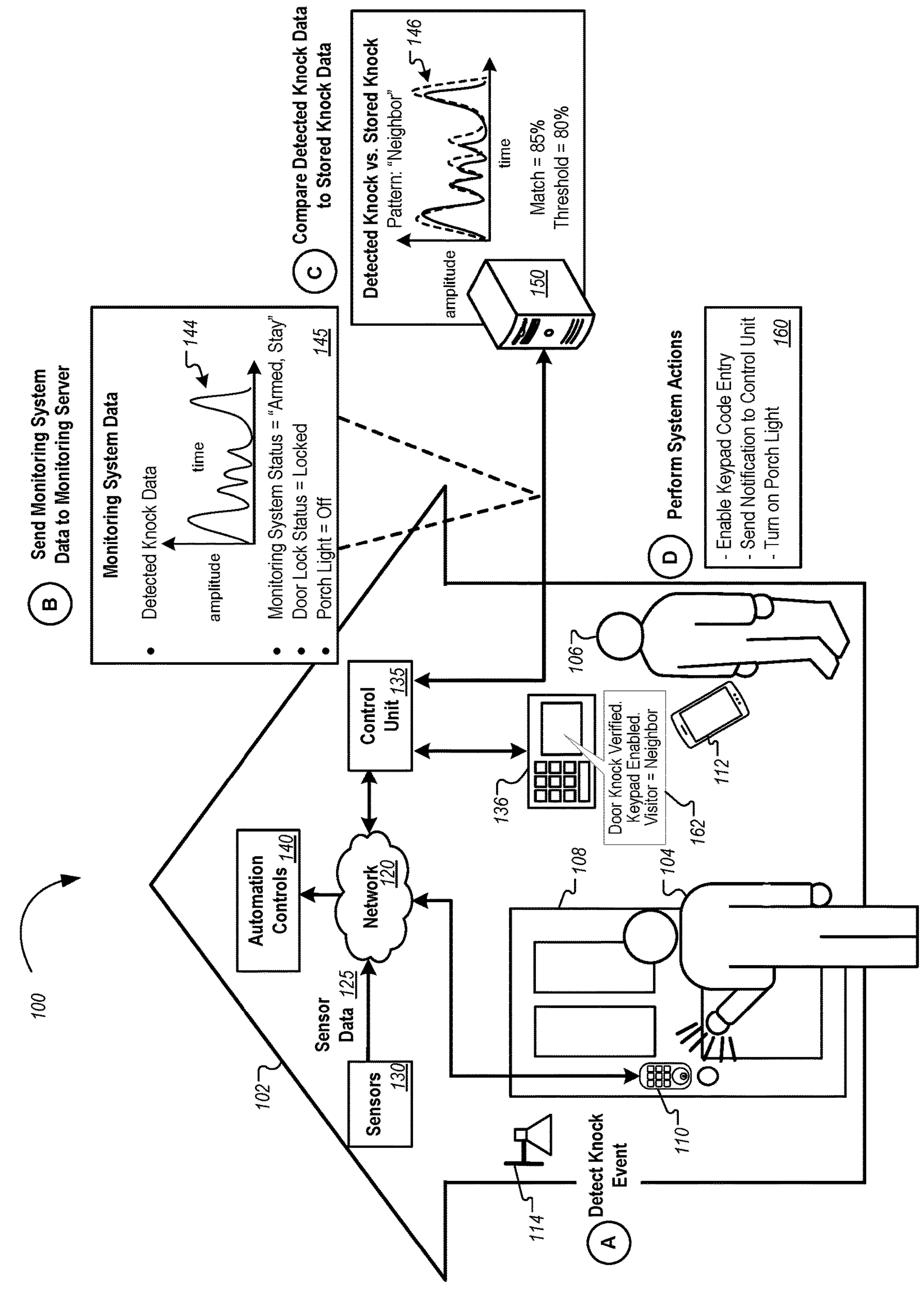
FIG. 1 is a diagram illustrating an example system for door knock access control.

FIG. 1 is a diagram illustrating an example system 100 for door knock access control.

A property 102 is monitored by a property monitoring system. The property 102 can be a home, another residence, a place of business, a public space, or another facility that has a knock-sensing lock 110 installed and is monitored by a monitoring system.

The property 102 includes a door 108 with a knock-sensing lock 110. To unlock the door 108, a visitor 104 must knock on the door 108 using a knocking pattern that matches a pre-recorded knocking pattern stored by a monitoring server 150 of the monitoring system. Once the visitor 104 knocks on the door 108 with a matching knocking pattern, the monitoring system enables a keypad on the knock-sensing lock 110. The visitor 104 can then enter an unlock code into the keypad to unlock the door 108.

In some examples, the knock-sensing lock 110 can be configured to receive an unlock code into the keypad first, and then to detect for a knocking pattern. A user such as a resident 106 can configure the knock-sensing lock 110 with this option according to the user's preferences.

An event in which a person knocks on the door 108 one or more times within a short time duration can be considered a knock event. Example knock events can include a person knocking on the door 108 two times within one second, three times within two seconds, or five times within five seconds. The knock-sensing lock 110 may reset after a certain amount of time with no knocking, e.g., five seconds or ten seconds. For example, if a person knocks two times within two seconds, then waits ten seconds, then knocks four times within five seconds, the knock-sensing lock 110 may classify the knocking as two separate knock events.

Figure 2:
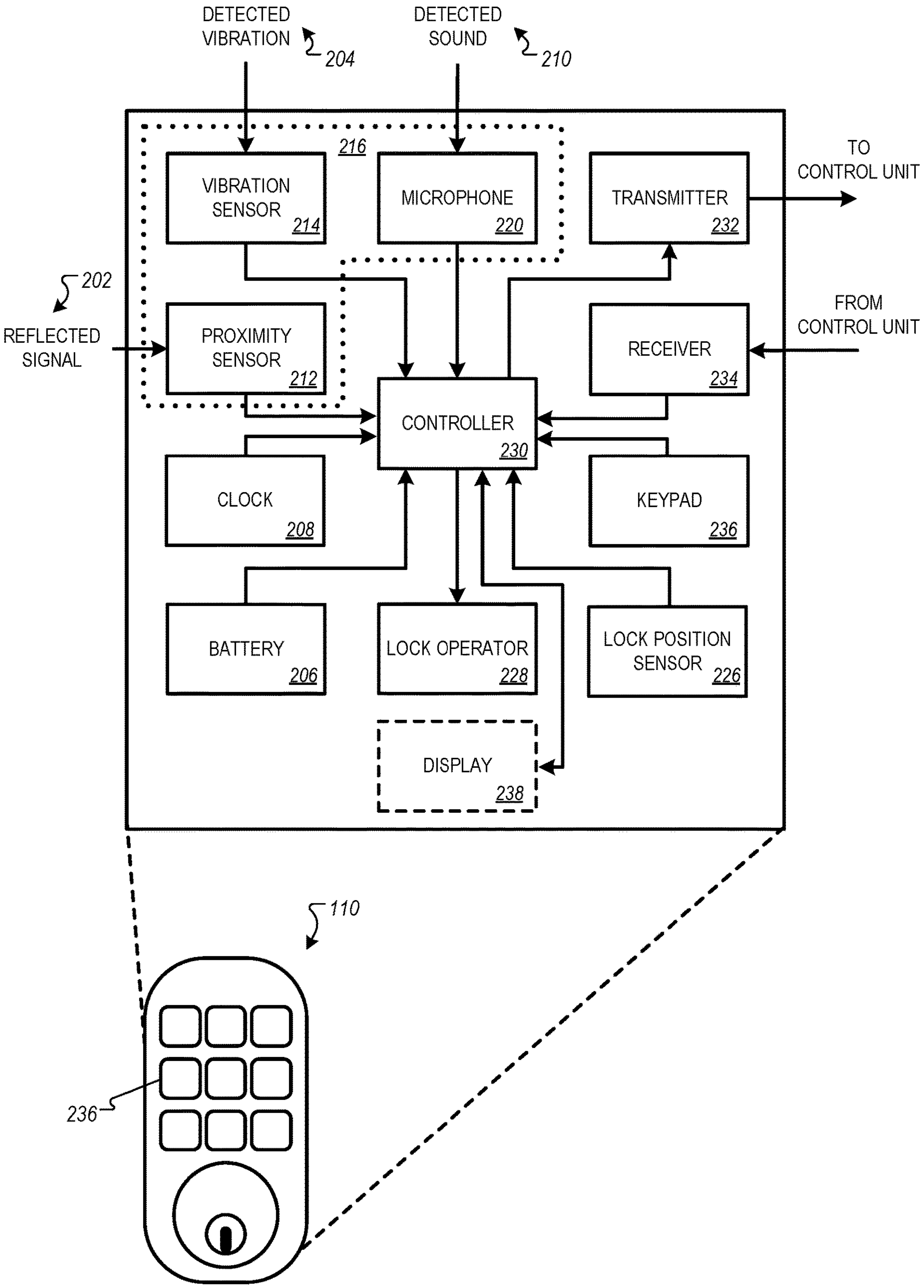
FIG. 2 is a block diagram of an example knock-sensing lock.

FIG. 2 is a block diagram of the example knock-sensing lock 110. The knock-sensing lock 110 includes knock detection sensors 216 incorporated into a smart lock. The knock detection sensors 216 include a microphone 220, a vibration sensor 214, and a proximity sensor 212. The knock-sensing lock 110 also includes a transmitter 232 and receiver 234 for communicating with a control unit 135 through a network 120 at the property 102.

The knock-sensing lock 110 includes a lock operator 228. The lock operator 228 can lock or unlock the door 108 in response to user input to a keypad 236. The keypad 236 can include keys, or buttons, labeled with numbers and/or letters that enable user entry of alphanumeric codes. When a user enters a code that matches a preset code, the lock operator 228 unlocks the door 108. The lock operator 228 can also lock or unlock the door 108 in response to remote control operation, e.g., a command sent through the network 120 from the control unit 135. Remote control operation can also include a command sent from a mobile device 112. The knock-sensing lock 110 can include a lock position sensor 226 to determine that the door 108 is locked or unlocked.

The knock-sensing lock 110 includes a controller 230. The controller 230 is configured to control the operations of the knock-sensing lock 110. The controller 230 can include one or more processors or microcontrollers. The controller 230 can receive knock data from the knock detection sensors 216 and send the data to the control unit 135 via the transmitter 232. The controller 230 can also receive a lock position status from the lock position sensor 226 and send the lock position status to the control unit 135. The controller 230 can also receive lock/unlock commands from the control unit 135 through the receiver 234, and send signals to the lock operator 228 to lock or unlock the door 108.

The knock-sensing lock 110 includes a battery 206. The battery 206 can be, for example, a rechargeable, non-rechargeable, or solar battery. The knock-sensing lock 110 includes a clock 208. The clock 208 can provide accurate clock timing for the components of the knock-sensing lock 110. The clock 208 can also measure timing of events detected by the knock detection sensors 216. For example, the clock 208 can measure a total time of a knock event and can measure time between knocks during the knock event.

In some examples, the knock-sensing lock 110 can optionally not include the clock 208. Instead, the knock-sensing lock 110 may send audio data from a knock event to the control unit 135 and/or the monitoring server 150, which can measure timing of the events detected by the knock detection sensors 216.

The knock-sensing lock 110 can optionally include a display 238. The display 238 can show text indicating a status of the knock-sensing lock 110. For example, the display 238 can show text such as "Processing Knocking Pattern," "Match Found," or "Match Not Found." The display 238 may also show symbols, such as a red light indicating that a knocking pattern match was not found, and a green light indicating that a knocking pattern match was found. The display 238 can show text directing the visitor 104 to perform an actions, e.g., "Match Not Found—Please Try Again," or "Match Found—Please Enter Code."

In some examples, the microphone 220 can be configured to turn on only when triggered by the proximity sensor 212. The proximity sensor 212 can measure the distance to an object. The proximity sensor 212 can be, for example, an infrared sensor, a laser sensor, a RADAR sensor, a SONAR sensor, or a LIDAR sensor. The proximity sensor 212 can emit an energy signal and measure the amount of time for the energy to reflect from the object back to the proximity sensor 212. Based on the time of return of the reflected signal 202, the proximity sensor 212 can determine a range to the object.

The proximity sensor 212 may be programmed with a set proximity range, e.g., six feet, eight feet, or ten feet. When an object approaches within the set range of the proximity sensor 212, the proximity sensor 212 can trigger the microphone 220 to turn on and to begin detecting sound. In some examples, the microphone 220 can be configured to remain continuously powered on.

In some examples, the microphone 220 can be configured to turn on when a user enters an unlock code into the keypad 236, instead of or in addition to turning on when an object approaches within the set range of the proximity sensor 212. In these examples, the knock-sensing lock 110 can optionally not include the proximity sensor 212.

The vibration sensor 214 can measure vibration 204 of the door 108. The vibration sensor 214 can be, for example, a pin-and-spring sensor, a non-contact displacement sensor, or an accelerometer. The vibration sensor 214 may measure an amplitude, frequency, and time duration of vibration 204 caused by knocking on the door 108.

In some examples, more than one vibration sensor 214, and/or more than one microphone 220, can be installed at multiple positions around the door 108. Using more than one sensor can enable the monitoring system to triangulate a position of the source of sound and vibration. Triangulating the source can improve accuracy of detecting door knocks. For example, the knock-sensing lock 110 can filter out sound and vibration that is generated too low to the ground, e.g., sounds that may be generated by an animal. The knock-sensing lock 110 can also filter out sound and vibration that is generated from a location other than the door 108, e.g., that are generated from a neighboring door.

Events that are detected by both the microphone 220 and the vibration sensor 214 are more likely to represent actual door knock events than events detected by only the microphone 220 or only the vibration sensor 214. For example, the microphone 220 may detect sounds from sources other than door knocks on the door 108, such as door knocks on a neighboring door, or footsteps on a sidewalk. The vibration sensor 214 may have improved accuracy by detecting vibration primarily of the door 108. However, the microphone 220 may have a higher accuracy in differentiating individual knocks, compared to the vibration sensor 214. Thus, detecting knock events using both sensors can be more accurate than detecting knock events with one sensor.

In some examples, the knock detection sensors 216, including the microphone 220, the vibration sensor 214, and proximity sensor 212, are all incorporated into the knock-sensing lock 110. In some examples, one or more of the knock detection sensors 216 may be installed as separate components.

In some examples, one or more of the knock detection sensors 216 may be incorporated into another device of the monitoring system, such as a doorbell. A doorbell with a camera may be used to confirm the door knock by detecting that a person is approaching the door. For example, the microphone 220 may be programmed to turn on when a doorbell camera detects a person within a set range to the doorbell. The doorbell camera may be used in conjunction with, or instead of, the proximity sensor 212 to confirm the door knock.

The microphone 220 and the vibration sensor 214 can send knock data to the controller 230. The controller 230 can use data output by the vibration sensor 214 to verify or validate knock data from the microphone 220. For example, if the microphone 220 detects sound, but the vibration sensor 214 does not detect vibration at approximately the same time as the detected sound, the controller 230 may disregard the detected sound due to the detected sound likely not being a knock on the door 108.

Vibration detected at approximately the same time as the detected sound can be, for example, vibration detected within a threshold time difference from the detected sound. For example, vibration detected at approximately the same time as the detected sound can be vibration detected within 0.2 seconds, 0.5 seconds, or 1.0 seconds before or after the detected sound. The time difference can be measured, for example, from the start of the detected sound, the middle of the detected sound, or the end of the detected sound.

In some examples, the controller 230 can correlate the knock data from the microphone 220 and the vibration sensor 214 to determine a confidence of the knock event. For example, if the microphone 220 detects sound, and the vibration sensor 214 does not detect vibration at approximately the same time as the detected sound, the controller 230 may determine a lower confidence level. If the microphone 2220 detects sound, and the vibration sensor 214 detects sound at approximately the same time as the detected sound, the controller 230 may determine a higher confidence level.

If the controller 230 determines that the confidence of the knock event is over a threshold confidence level, the controller 230 can send the knock data to the control unit 135 via the transmitter 232 over the network 120. Knock data can include an audio signature, including time-varying amplitudes, frequencies, and volumes of sound detected by the microphone 220. Knock data can also include time-varying vibration levels detected by the vibration sensor 214. Knock data can also include characteristics of the sound, e.g., a number of knocks detected, a duration of knocking, an amount of rest time between knocks, etc.

In some examples, the knock-sensing lock 110 may send the knock data directly to the control unit 135 and/or the monitoring server 150, without analyzing the knock data. For example, the knock-sensing lock 110 may send knock data that includes an audio recording of a knock event with a maximum time limit, e.g., of ten seconds. The monitoring server 150 can receive and analyze the audio recording. In some examples, the knock-sensing lock 110 may send knock data that includes live-streamed audio data from a knock event. The monitoring server 150 can receive and analyze the audio data in real-time.

In addition to the knock-sensing lock 110, the monitoring system includes one or more additional sensors 130 located at the property 102 that collect sensor data 125 related to the property 102. The monitoring system includes a control unit 135 that has the ability to communicate with and control various devices on the property 102 through automation controls 140. The sensors 130 can include, for example light sensors, surveillance cameras, and door and window lock sensors. The sensors 130 send the sensor data 125 to the control unit 135 through the network 120.

The control unit 135 can be, for example, a computer system or other electronic device configured to communicate with the knock-sensing lock 110 and the sensors 130. The control unit 135 can also perform various management tasks and functions for the monitoring system. In some implementations, a resident 106 of the property, or another user, can communicate with the control unit 135 (e.g., input data, view settings, or adjust parameters) through a physical connection, such as a control panel 136, through a touch screen, keypad 236, and/or a voice interface.

The knock-sensing lock 110 and the sensors 130 may communicate with the control unit 135 through the network 120. The network 120 can be any communication infrastructure that supports the electronic exchange of data between the control unit 135, the knock-sensing lock 110, and sensors 130. For example, the network 120 may include a local area network (LAN). The network 120 may be any one or combination of wireless or wired networks and may include any one or more of Ethernet, Bluetooth, Bluetooth LE, Z-wave, Zigbee, or Wi-Fi technologies. The system 100 includes the monitoring server 150. The monitoring server 150 can be, for example, one or more computer systems, server systems, or other computing devices that are located remotely from the property 102 and that are configured to process information related to the monitoring system at the property 102. In some implementations, the monitoring server 150 is a cloud computing platform.

The control unit 135 communicates with the monitoring server 150 via a long-range data link. For example, the control unit 135 can send monitoring system data 145 to the monitoring server 150. The long-range data link can include any combination of wired and wireless data networks. For example, the control unit 135 can exchange information with the monitoring server 150 through a wide-area-network (WAN), a broadband internet connection, a cellular telephony network, a wireless data network, a cable connection, a digital subscriber line (DSL), a satellite connection, or other electronic means for data transmission. The control unit 135 and the monitoring server 150 may exchange information using any one or more of various communication synchronous or asynchronous protocols, including the 802.11 family of protocols, TCP/IP, GSM, 3G, 4G, 5G, LTE, CDMA-based data exchange or other techniques. In some implementations, the long-range data link between the control unit 135 and the monitoring server 150 is a secure data link (e.g., a virtual private network) such that the data exchanged between the control unit 135 and the monitoring server 150 is encoded to protect against interception by an adverse third party.

In some implementations, various monitoring system components located at the property 102 communicate directly with the monitoring server 150 (e.g., sending data directly to the monitoring server 150 rather than sending data to the monitoring server 150 via the control unit 135). For example, the knock-sensing lock 110, the sensors 130, the automation controls 140, or other devices at the property 102 can provide some or all of the monitoring system data 145 to the monitoring server 150, e.g., through an internet connection.

In some implementations, the control unit 135 processes some or all of the monitoring system data 145 before sending the monitoring system data 145 to the monitoring server 150. For example, the control unit 135 may compress or encode the monitoring system data 145 to reduce the bandwidth required to support data transmission. The control unit 135 can also aggregate, filter, transform, or otherwise process some or all of the monitoring system data 145.

The monitoring server 150 can store pre-recorded knock data. Stored knock data 146 can include audio signatures, including time varying amplitudes, frequencies, and volumes of audio collected from a stored knock event. The stored knock event can be recorded by a user, e.g., the resident 106 of the property 102. The resident 106 can record the knock event, for example, upon installing the knock-sensing lock 110, or upon moving in to the property 102.

The stored knock event can include a particular pattern chosen by the resident 106. An example pattern for a knock event can include one loud knock, followed by a half-second rest, followed by three knocks in rapid succession. The resident 106 can record multiple different stored knock events with various patterns. For example, the resident 106 may record a distinct pattern for each user, e.g., for each member of the household of the property 102. The resident 106 can assign a specific pattern to a specific user, for example, by inputting assignments into the control panel 136.

The stored knock event can be recorded by one or more recording devices that can communicate with the monitoring server 150. In some examples, the recording device can be the knock-sensing lock 110. The resident 106 can enter an initiating code into the keypad 236 to signal that the resident 106 is ready to record the stored knock event. Upon receiving the initiating code, the knock-sensing lock 110 can begin to record the knock event with the microphone 220.

In some examples, the recording device can be the control panel 136. The resident 106 can enter an initiating code into the control panel 136 to signal that the resident 106 is ready to record the stored knock event. Upon receiving the initiating code, the control panel 136 can begin to record the knock event.

In some examples, the recording device can be a computing device such as the mobile device 112. In this way, the resident 106 can record the knock event while the resident 106 may be away from the property 102. The resident 106 can initiate recording through a software application executing on the mobile device 112, e.g., by pressing a "record" button. The mobile device 112 can then begin to record the knock event.

After initiating recording, the resident 106 can knock on the door 108, a wall, or another hard surface with the chosen pattern. When the resident 106 completes the pattern, the resident 106 can terminate recording. For example, the resident 106 may terminate recording by pressing a "pound" key or a "stop" button on the recording device. In some examples, if there are no knocking sounds after a period of time, e.g., five seconds, the recording device may automatically terminate recording.

The recording device can record and save the knock event as an audio file. The recording device can send the audio file to the monitoring server 150 over the long-range data link. The monitoring server 150 can analyze the signature of the audio file to obtain the stored knock data 146. From the stored knock data, the monitoring server 150 can use audio analytics techniques to determine characteristics of the stored knock data 146. For example, the monitoring server 150 can determine a number of knocks within a knock event, and a rest time between each knock. The monitoring server 150 may determine that an example knock event includes three knocks, with a half-second rest in between each knock. In another example, a knock event can include a first knock, a quarter second rest, a second knock, a half second rest, and a third knock.

The monitoring server 150 can store the stored knock data 146 in a database. The stored knock data 146 can include the audio signature, the associated property 102, and the assigned user. In some examples, the assigned user may be a user group, e.g., "Family" of "Neighbor." In some examples, the assigned user may be an individual person, e.g., "Mom," or "Brian." The resident 106 or other user can add, change, or delete stored knock data at any time. The resident 106 can also change knock pattern assignments to users at any time.

The monitoring server 150 may store knock data that corresponds to one or more duress codes. The resident 106 may pre-record a duress code to be used, for example, if a user is being forced to enter the property 102 by an intruder. The user can enter the duress code knocking pattern in order to obtain access to the property 102. The monitoring server 150 can then determine that the knocking pattern matches the duress code. In response to identifying the duress code, the monitoring server 150 may then automatically send an emergency notification to emergency responders.

In some examples, the resident 106 can share knocking patterns through the monitoring system. The resident 106 can select, e.g., through the control panel 136 or mobile device 112, to share a knocking pattern with a visitor, such as a dog walker, who needs to enter the property 102. The software application running on the control panel 136 or the mobile device 112 can send a message, e.g., a text message or an email, to the visitor. The message can include an audio file of the knocking pattern.

In some examples, the resident 106 can add stored knock data 146 for a temporary pattern. For example, the resident 106 may have maintenance scheduled at the property 102 on Tuesday. The resident 106 can record a knock event with a temporary pattern for the maintenance person. The resident 106 can assign the knock event to a user, "maintenance person," and input a setting that the temporary pattern expires at 6:00 pm on Tuesday evening. The resident 106 can share the temporary pattern with the maintenance person as described above. At 6:00 pm on Tuesday, the temporary pattern expires and can no longer be used to enable the keypad. Therefore, though the maintenance person may remember the keypad access code to the knock-sensing lock 110, the maintenance person will not be able to unlock the door 108 after 6:00 pm.

In some examples, the resident 106 can designate certain patterns for certain doors at the property 102. For example, the resident 106 may designate a first pattern for the front and back doors, and a second pattern for only the back door. The resident 106 can then share the second pattern with users who are preferred to enter through the back door, e.g., delivery personnel. Thus, though the delivery personnel may know the access codes to both the front and back door, the knocking pattern will only grant access to the back door.

FIG. 1 includes stages (A) through (E), which represent a flow of data. In stage (A) of FIG. 1, the knock-sensing lock 110 detects a knock event. The visitor 104 approaches the door 108 of the property 102. The visitor 104 is a neighbor of the property 102. The proximity sensor 212 detects the range, or proximity, to the visitor 104. When the visitor 104 crosses within a set proximity to the door 108, the proximity sensor 212 sends a signal to the controller 230 to activate the microphone 220.

The visitor 104 knocks on the door 108 using a knocking pattern. The knocking pattern includes one loud knock, three softer knocks, then one louder knock. The microphone 220 detects the sound of the knock event.

When the visitor 104 completes the knocking pattern, the visitor can press a key on the knock-sensing lock 110, e.g., a pound key. The pound key signifies that the monitoring system can begin processing the knock event. If the visitor 104 does not press the pound key within a specified period of time, e.g., five seconds, the monitoring system can automatically begin processing the knock event.

The vibration sensor 214 detects the vibration of the knock event. The microphone 220 and the vibration sensor 214 send the sound and vibration data to the controller 230. Since the knock event was detected by both sensors, the controller sends the sound and vibration data ("detected knock data 144") to the control unit 135 via the transmitter 232.

The transmitter 232 sends detected knock data 144 to the control unit 135 through the network 120. The control unit 135 receives the detected knock data 144 from the knock-sensing lock 110, and the sensor data 125 from the sensors 130.

In stage (B) of FIG. 1, the control unit 135 sends the monitoring system data 145 to a remote monitoring server 150. The monitoring system data 145 can include the detected knock data 144 from the knock-sensing lock 110, and the sensor data 125 from the sensors 130. The control unit 135 also sends the status of the monitoring system to the monitoring server 150. For example, the monitoring system may have settings of "unarmed," "armed, stay," and "armed, away."

The monitoring system data 145 includes the detected knock data 144. The detected knock data 144 includes the audio signature of the knocking pattern, including time-varying amplitudes of the audio data from the knock event. The detected knock data 144 includes five audio pulses with four sequential rapid increases and decreases in amplitude. The first and fifth audio pulses have a greater amplitude than the middle three pulses.

The monitoring system data 145 can also include data from sensors 130 at the property, such as surveillance camera footage, light sensor data, and door lock sensor data. For example, the monitoring system data 145 can include light sensor data indicating that the porch light 114 is off, and door lock data indicating that the front door is locked. The monitoring system data 145 can also include the monitoring system status, indicating that the monitoring system is set to a status of "armed, stay."

The control unit 135 may process some or all of the monitoring system data 145 before sending the monitoring system data 145 to the monitoring server 150. For example, the control unit 135 may analyze the detected knock data 144 to determine if the detected knock data 144 likely represents an actual knock event. The control unit 135 may determine if the detected knock data 144 likely represents a knock event based on analyzing, for example, a peak amplitude, time duration, and/or number of knocks of the knock event. The control unit 135 may determine not to send detected knock data 144 to the monitoring server 150 if the control unit 135 determines that the detected knock data does not likely represent a knock event. Thus, the control unit 135 can filter out audio data caused by sound sources other than knocking, e.g., tree branches, animals, and vehicles.

In stage (C), the monitoring server 150 compares the detected knock data 144 to stored knock data 146. In some examples, the monitoring server 150 can compare the detected knock data 144 to audio signatures of each of the stored knocking patterns in the database. The monitoring server 150 can then determine which stored knocking pattern in the database most closely matches the detected knock data 144, and can determine a matching percentage of the stored knocking pattern.

In some examples, the monitoring server 150 may perform a preliminary analysis on the knock data 144 in order to identify and select a subset of stored knocking patterns that most closely match the knock data 144. The monitoring server 150 can then perform a secondary analysis on the knock data 144 to determine a matching percentage of the knock data 144 with each of the selected stored knocking patterns.

For example, the monitoring server 150 can perform a preliminary analysis on the knock data 144 by comparing one or more characteristics of the knock data 144 to the stored knocking patterns. For example, the monitoring server 150 can perform a preliminary analysis based on a characteristic of the number of knocks.

For example, the monitoring server 150 may store a first set of knocking patterns with three knocks, and corresponding data indicating that the number of knocks in each pattern of the first set of knocking patterns is three knocks. Similarly, the monitoring server 150 may store a second set of knocking patterns with four knocks, and corresponding data indicating that the number of knocks in each pattern of the second set of knocking patterns is four knocks. When a knock is detected with four sound pulses, e.g., four knocks, the monitoring server 150 can perform a preliminary analysis to identify the characteristic of four knocks, select the second set of knocking patterns with four knocks, and perform a secondary analysis to determine a matching percentage of the detected knock with each of the selected stored knocking patterns of the second set.

By performing a preliminary analysis based on characteristics of the knock data 144, the monitoring server 150 can reduce the amount of time and the amount of processing required to compare the knock data 144 to the stored knock data. For example, by pre-storing the second set of knocking patterns and the corresponding data indicating that the number of knocks in each pattern of the second set of knocking patterns is four knocks, the monitoring server 150 will not need to analyze the number of knocks in the stored knocking patterns each time a knock is detected.

In another example, the monitoring server 150 can perform a preliminary analysis based on a characteristic of, for example, a duration of the detected audio or a rest time between sound pulses. In some examples, the monitoring server 150 can perform the preliminary analysis based on more than one characteristic. For example, the monitoring server 150 can perform the preliminary analysis based on the number of knocks and the duration of the detected audio.

In the example of FIG. 1, the based on a preliminary analysis, monitoring server 150 selects one or more stored knocking patterns for secondary analysis. The selected knocking patterns include a stored knocking pattern assigned to the user group "Neighbor." The monitoring server 150 performs a secondary analysis by comparing the audio signatures of the detected knock data 144 and the stored knock data 146 of the "Neighbor" knocking pattern to determine a matching percentage. The monitoring server 150 can compare the audio signatures using any appropriate acoustic fingerprinting algorithm. The monitoring server 150 can compare characteristics of the audio signatures, including, for example, a wave sequence, zero crossing rate, bandwidth, wavelength, peak pulse amplitudes, knock event time duration, number of pulses, and rest time between pulses.

The monitoring server 150 can compare the matching percentage to a threshold matching percentage. The threshold matching percentage can be, for example, 75%, 80%, or 85%. If the matching percentage exceeds the threshold matching percentage, the monitoring server 150 can classify the detected knock data 144 as a match.

The monitoring server 150 determines a matching percentage of 85% between the detected knock data 144 and the stored knock data 146. The monitoring server 150 compares the matching percentage of 85% to the threshold matching percentage of 80%. The monitoring server 150 determines that the matching percentage exceeds the threshold matching percentage, and classifies the detected knock data 144 as a "Match."

The resident 106 or another user may be able to adjust the threshold matching percentage. For example, the resident 106 may adjust the threshold to a lower percentage to make it easier for visitors to match the stored knock data 146. The resident 106 may adjust the threshold to a higher percentage to make it more difficult to match the stored knock data 146. In some examples, the resident 106 may raise the threshold when the resident 106 is on vacation, and may lower the threshold when the resident 106 returns to the property 102.

In some examples, the monitoring server 150 can automatically adjust the threshold matching percentage. For example, the monitoring server 150 may raise the threshold when the monitoring system is armed, and may lower the threshold when the monitoring system is unarmed. In another example, the monitoring server 150 may raise the threshold at night time, and may lower the threshold during day time.

In some examples, the monitoring server 150 can adjust the thresholds for individual stored knocking patterns, e.g., based on user feedback. For example, the resident 106 may provide feedback, e.g., through the control panel 136 that a certain knocking pattern is difficult to match. The monitoring server 150 may lower the threshold for the certain knocking pattern, while maintaining the thresholds of other knocking patterns.

In some examples, the monitoring server 150 can adjust the threshold matching percentage based on environmental conditions at the property 102, such as weather conditions. For example, the monitoring server 150 may receive weather data from sensors at the property 102, or may receive weather data from a source such as the internet. The monitoring server 150 may lower the threshold when the weather is clear, and may raise the threshold when the weather is stormy. For example, the monitoring server may raise the threshold when the weather is stormy in order to reduce the likelihood that sounds other than door knocking sounds will inadvertently cause the keypad to be enabled. For example, on a windy day, tree branches knocking against a structure may sound similar to a door knock. Thus, the monitoring server 150 can raise the threshold matching percentage when weather conditions are windy in order to reduce the likelihood of the system mistaking the sound of a tree branch for a door knock that matches a stored knocking pattern.

For example, the monitoring server may raise the threshold at night time in order to reduce the likelihood that sounds other than door knocking sounds will inadvertently cause the keypad to be enabled. For example, on a windy day, tree branches knocking against a structure may sound similar to a door knock. Thus, the monitoring server 150 can raise the threshold matching percentage when weather conditions are windy in order to reduce the likelihood of the system mistaking the sound of a tree branch for a door knock that matches a stored knocking pattern.

In some examples, the monitoring server 150 can correlate the detected knock data 144 with other monitoring system data 145 to further authenticate the visitor 104. For example, a doorbell camera may capture images of the visitor 104. The doorbell camera or the monitoring server 150 may perform facial recognition on the images to identify the visitor 104. The monitoring server 150 may compare the selected stored knocking pattern 146 to the facial recognition determination to authenticate the visitor 104. For example, the monitoring server 150 can verify that the face of the visitor 104, whose knock matches the stored knocking pattern 146 assigned to the user group "Neighbor," matches the face of a recognized neighbor of the property 102.

In stage (D) of FIG. 1, the monitoring server 150 performs system actions 160. For example, the monitoring server 150 can perform the actions 160 by sending a command to a device of the monitoring system through a signal to the control unit 135 over the long-range data link.

The monitoring server 150 performs the action 160 of enabling keypad code entry to the property 102. For example, the monitoring server 150 can send a command to the control unit 135 to enable the keypad 236 of the knock-sensing lock 110. The control unit 135 can enable the keypad 236 by sending a signal through the network 120. The knock-sensing lock 110 can receive the signal via the receiver 234. The controller 230 can then enable the keypad 236.

The knock-sensing lock 110 may provide the visitor 104 with an indication that the keypad 236 is enabled. For example, the knock-sensing lock 110 may show text stating, "Enter Access Code," or may illuminate a green light. Once the keypad 236 is enabled, the visitor 104 can enter a code by pressing buttons on the keypad 236. Upon receiving a correct code, the controller 230 unlocks the door 108 using the lock operator 228. If the visitor 104 enters the code before the keypad 236 is enabled, the door 108 will remain locked.

The monitoring server 150 performs the action 160 of sending a notification 162 to the control panel 136. The notification 162 informs the resident 106 that a visitor 104 is knocking on the door 108. The notification 162 can also include the suspected identity of the visitor 104, based on the user category of the knocking pattern. For example, the notification 162 includes that the visitor 104 is likely a neighbor. In some examples, the monitoring server 150 can send the notification to the mobile device 112 instead of, or in addition to, the control panel 136. The monitoring server 150 also performs the action 160 of turning on the porch light 114 through automation controls 140.

In some examples, the monitoring server 150 may perform different actions 160 for different visitors. For example, for a visitor who is assigned to the Neighbor user group, the monitoring server 150 may enable the keypad 236 and send the notification 162. For a visitor who is assigned to a Family user group, the monitoring server 150 may perform an action of sending a command to the knock-sensing lock 110 to unlock the door 108.

In some examples, the monitoring server 150 may determine that the matching percentage is less than the threshold matching percentage. The monitoring server 150 then classifies the detected knock data 144 as "not a match." In response to classifying the detected knock data 144 as not a match, the monitoring server 150 can send a command to the control unit 135 to prompt the visitor 104 to re-try the knocking pattern through an indication on the knock-sensing lock. For example, the knock-sensing lock 110 may show text on the display 238 stating, "Please Try Again," or may illuminate a red light.

The knock-sensing lock 110 may allow the visitor 104 a specified number of attempts before disabling access. For example, the knock-sensing lock 110 may allow three attempts for performing the knocking pattern. After the third attempt, the knock-sensing lock 110 may disable the keypad 236 for a designated period of time, e.g., thirty minutes. The resident 106 may override the disabled keypad 236 by selecting an option and/or entering a code through the control panel 136 or the mobile device 112. The resident 106 can also adjust the number of attempts allowed for individual users.

The monitoring server 150 can use a rules-based system to determine system actions 160. The rules can be default rules, set in advance by a system administrator. The rules can also be custom rules, set or modified by the resident 106 or another authorized user of the monitoring system. The rules may be general, such that they are applied to more than one property, or they may be specific to the particular property 102. In some implementations, the rules can be customized according to a particular time of day or other factors.

In some implementations, the rules can be programmed into the control unit 135 in addition to, or instead of, the monitoring server 150. In some implementations, rules can be programmed into the knock-sensing lock 110 or another local component of the monitoring system. The control unit 135, knock-sensing lock 110, or other local component can analyze the monitoring system data 145 and determine actions 160 based on the rules.

In some implementations, the resident 106 can customize the one or more rules according to his or her preferences. In some implementations, the resident 106 can set the one or more rules through a software application executing on a mobile device 112, through a graphical interface provided by a browser or application on a computing device, and/or through interacting with a physical interface of the control panel 136 of the monitoring system.

Though described above as being performed by a particular component of system 100 (e.g., the control unit 135 or the monitoring server 150), any of the various control, processing, and analysis operations can be performed by either the control unit 135, the monitoring server 150, or another computer system of the system 100. For example, the control unit 135, the monitoring server 150, or another computer system can analyze the monitoring system data 145 from the knock-sensing lock 110 and sensors 130 to determine the actions 160. Similarly, the control unit 135, the monitoring server 150, or another computer system can control the various sensors 130, the knock-sensing lock 110, and/or the property automation controls 140 to collect data or control device operation.

Figure 3:
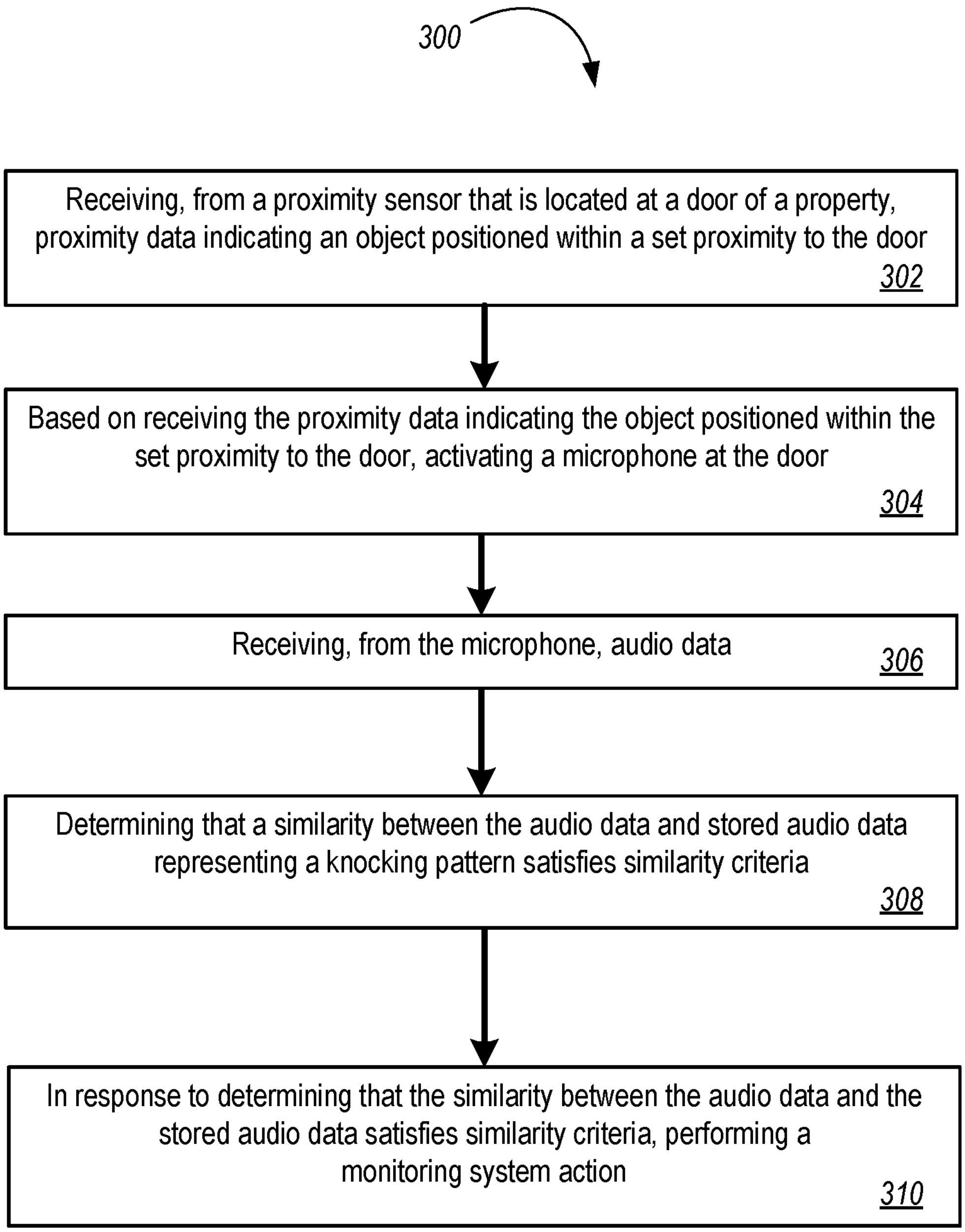
FIG. 3 is a flow chart illustrating an example process for door knock access control.

FIG. 3 is a flow chart illustrating an example process 300 for door knock access control. The process 300 is performed by a component of the property monitoring system. For example, the process 300 can be performed by the knock-sensing lock 110, the control unit 135, the monitoring server 150, or another computer system of the property monitoring system.

Briefly, process 300 includes receiving, from a proximity sensor that is located at a door of a property, proximity data indicating an object positioned within a set proximity to the door (302), based on receiving the proximity data indicating the object positioned within the set proximity to the door, activating a microphone at the door (304), receiving, from the microphone, audio data (306), determining that a similarity between the audio data and stored audio data representing a knocking pattern satisfies similarity criteria (308), and in response to on determining that the similarity between the audio data and the stored audio data satisfies similarity criteria, performing a monitoring system action (310).

In greater detail, the process 300 includes receiving, from a proximity sensor that is located at a door of a property, proximity data indicating an object positioned within a set proximity to the door (302). In some implementations, the microphone and proximity sensor are integrated into a device. In some implementations, the microphone, proximity sensor, and door lock are integrated into a device. For example, the microphone, the proximity sensor, the door lock, or any combination of these may be integrated into a device such as the knock-sensing lock 110.

The proximity sensor can be, for example, the proximity sensor 212 of the knock-sensing lock 110, installed at the door 108 of the property 102. The set proximity to the door can be a threshold set by a user of the knock-sensing lock 110, e.g., the resident 106. The object may be a person, e.g., the visitor 104. The proximity sensor 212 can be installed at a position such that the object is likely a human. For example, the proximity sensor can be installed at a height that is higher above the ground than the height of most animals.

The process 300 includes, based on receiving the proximity data indicating the object positioned within the set proximity to the door, activating a microphone at the door (304). The microphone can be, for example, the microphone 220 of the knock-sensing lock 110. The microphone 220 may remain turned off until activated, in order to save battery power and processing power. The set proximity to the door can be, for example, less than three feet, less than five feet, less than seven feet, etc.

The process 300 includes receiving, from the microphone, audio data (306). The audio data can be, for example, the detected knock data 144. The audio data can represent sound produced by a knock event. The audio data can include time-varying amplitudes, frequencies, and time durations of the knock event.

The process 300 includes determining that a similarity between the audio data and stored audio data representing a knocking pattern satisfies similarity criteria (308). The stored audio data can be, for example, the stored knock data 146 representing one or more knocking patterns.

In some implementations, the process 300 includes accessing, from a database that includes stored audio data representing a plurality of knocking patterns, the stored audio data representing the knocking pattern. For example, the knocking patterns can be pre-recorded by the resident 106 and stored in a database.

In some implementations, determining that the similarity between the audio data and the stored audio data satisfies similarity criteria includes computing a matching percentage between the audio data and the stored audio data. For example, determining a similarity between the audio data and the stored audio data can include determining a matching percentage between the detected knock data 144 and the stored knock data 146.

In some implementations, the similarity criteria can be a pre-programmed threshold matching percentage. Determining that the similarity between the audio data and the stored audio data satisfies similarity criteria can include determining that the matching percentage exceeds a threshold matching percentage and classifying the detected knocking knock data 144 as a "Match" to the stored knock data 146.

In some implementations, the threshold matching percentage is based on an arming status of the monitoring system or an occupancy of the property. For example, the monitoring system may have settings of "unarmed," "armed, stay," and "armed, away." The threshold matching percentage may be higher when the monitoring system is armed, and may be lower when the monitoring system is unarmed. For example, the system may receive input data indicating the current arming status of the monitoring system. The system may raise the threshold matching percentage, e.g., to 90%, in response to the monitoring system status changing from unarmed to armed. The system may lower the threshold matching percentage, e.g., to 70%, in response to the monitoring system status changing from armed to unarmed. In another example, the system may receive input data indicating an occupancy of the property. Based on determining that the property occupancy has changed from occupied to unoccupied, the system may raise the threshold matching percentage, e.g., to 85%. Based on determining that the property occupancy has changed from unoccupied to occupied, the system may lower the threshold matching percentage, e.g., to 60%.

In some implementations, the threshold matching percentage is based on an environmental condition at the property. For example, the threshold matching percentage may be based on weather conditions at the property. The threshold matching percentage may be higher during stormy weather conditions, and may be lower during clear weather conditions. For example, the system may receive input data indicating weather conditions at the property. Based on determining that the weather has changed from clear to stormy, the system may raise the threshold matching percentage, e.g., to 80%. Based on determining that the weather has changed from stormy to clear, the system may lower the threshold matching percentage, e.g., to 65%.

In some implementations, the audio data includes a characteristic of the detected sound. In some implementations, the characteristic includes one of a peak volume, an average frequency, a peak pulse amplitude, a time duration, a number of sound pulses, or a rest time between sound pulses of the detected sound. Determining that a similarity between the audio data and the stored audio data satisfies similarity criteria can include computing a difference between the characteristic of the detected sound and the characteristic of the stored audio data; and determining that the difference between the characteristic of the detected sound and the characteristic of the stored audio data is less than a threshold difference. For an example characteristic of time duration, the duration of detected sound may be 5.8 seconds. The duration of the stored audio data may be 5.0 seconds. Therefore, the difference between the duration of the detected sound and the duration of the stored audio data is 0.8 seconds. The threshold difference may be, for example, 1.0 seconds. Thus, the difference between the duration of the detected sound and the duration of the stored audio data of 0.8 seconds is less than the threshold difference of 1.0 seconds. Based on determining that the difference between the duration of the detected sound and the duration of the audio data is less than the threshold difference, the system can determine that the similarity between the audio data and the stored audio data satisfies similarity criteria.

In some implementations, the audio data includes a time-varying parameter of the detected sound. In some implementations, the time-varying parameter includes one of a time-varying amplitude or a time-varying frequency of the detected sound. Determining that a similarity between the audio data and the stored audio data satisfies similarity criteria can include computing a matching percentage between the time-varying parameter of the detected sound and the time-varying characteristic of the stored audio data; and determining that the matching percentage exceeds a threshold matching percentage. For an example time-varying parameter of amplitude, the matching percentage between the time-varying amplitude of the detected sound and the time-varying amplitude of the stored audio data may be 72%. The threshold matching percentage may be 65%. Thus, the matching percentage between the time-varying amplitude of the detected sound and the time-varying amplitude of the stored audio data of 72% exceeds the threshold matching percentage of 65%. Based on determining that the matching percentage between the time-varying amplitude of the detected sound and the time-varying amplitude of the stored audio data exceeds the threshold matching percentage, the system can determine that the similarity between the audio data and the stored audio data satisfies similarity criteria.

In some implementations, determining that a similarity between the audio data and the stored audio data satisfies similarity criteria includes determining a value of a characteristic of the audio data, and selecting, for comparison with the audio data, and from the database that includes the stored audio data, a subset of the plurality of knocking patterns, where the value of the characteristic of each knocking pattern of the subset of knocking patterns matches the value of the characteristic of the audio data within a programmed margin. For example, the system may determine, for a value of a characteristic of the audio data, a time duration of 5.8 seconds. The system can select, for comparison with the audio data, a subset of stored knocking patterns that each has a time duration that matches the time duration of 5.8 seconds within a programmed margin. The programmed margin may be, for example, 1.0 seconds. Thus, the system can select a subset of the stored knocking patterns that have a time duration between 4.8 seconds and 6.8 seconds.

The system can compute a matching percentage between a time-varying parameter of the detected sound and the time-varying parameter of each knocking pattern of the subset of knocking patterns. For example, the system can compute a matching percentage between a time-varying amplitude of the detected sound and the time-varying amplitude of each knocking pattern of the subset that have a time duration between 4.8 seconds and 6.8 seconds.

The system can determine that the matching percentage between the time-varying parameter of the detected sound and the time-varying parameter of at least one knocking pattern of the subset of knocking patterns exceeds a threshold matching percentage. For example, the system may determine that the matching percentage between the time-varying amplitude of the detected sound and the time-varying amplitude of a first knocking pattern of the subset is 51%. The system may determine that the matching percentage between the time-varying amplitude of the detected sound and the time-varying amplitude of a second knocking pattern of the subset is 84%. The threshold matching percentage may be 70%. Thus, the system can determine that the matching percentage between the time-varying amplitude of the detected sound and the time-varying amplitude of the second knocking pattern of the subset exceeds the threshold matching percentage. Based on the matching percentage exceeding the threshold matching percentage, the system can determine that the similarity between the audio data and the stored audio data of the second knocking pattern satisfies similarity criteria.

In some implementations, the operations include obtaining, from a vibration sensor, vibration data indicating vibration of the door. For example, the system may obtain, from the vibration sensor 214, vibration data. The operations can include determining, based on the vibration data, that a confidence level that the audio data represents a knock on the door exceeds a threshold confidence level; and in response to determining that the confidence level that the audio data represents a knock on the door exceeds the threshold confidence level, determining the similarity between the audio data and the stored audio data representing the knocking pattern. In this way, the audio data can be verified using vibration data in order to filter out noise sources. For example, based on receiving vibration data that indicates vibration of the door at approximately the same time as audio was detected, the system can determine a higher confidence level that the audio data represents a knock on the door. Based on receiving vibration data that indicates a lack of vibration of the door at approximately the same time as audio was detected, the system can determine a lower confidence level that the audio data represents a knock on the door.

As an example, the controller 230 may receive audio data from the microphone 220 and vibration data from the vibration sensor 214 indicating vibration of the door 108 within 0.3 seconds of audio being detected by the microphone. Based on detecting vibration and sound within 0.3 seconds of each other, the controller 230 may determine a confidence level of 90% that the audio data represents a knock on the door. In another example, the controller 230 may receive audio data from the microphone 220 and vibration data from the vibration sensor 214 indicating vibration of the door 108 at 1.5 seconds after audio was detected by the microphone. Based on detecting vibration 1.5 seconds after the audio was detected, the controller 230 may determine a confidence level of 50% that the audio data represents a knock on the door. In another example, the controller 230 may receive vibration data indicating no vibration of the door 108 within 5.0 seconds of audio being detected, and may determine a confidence level of 15% that the audio data represents a knock on the door.

In some examples, the system may compare detected vibration data to stored vibration data representing vibration of stored knocking patterns. For example, in addition to analyzing audio data, the system may determine a matching percentage between characteristics and parameters of vibration data and stored vibration data. In this way, the system can use vibration data to verify that the audio and vibration corresponds to a stored knocking pattern. For example, if both the audio data and the vibration data match with a stored knocking pattern within a programmed margin, the system may determine a higher confidence of the match. If only the vibration data or the audio data match with the stored knocking pattern, the system may determine a lower confidence of the match. Likewise, if the vibration data and the audio data match with different stored knocking patterns, the system may determine a lower confidence of the match.

The process 300 includes, in response to determining that the similarity between the audio data and the stored audio data satisfies similarity criteria, performing a monitoring system action. In some implementations, the monitoring system action includes enabling a keypad of a door lock. For example, the monitoring system actions can include enabling keypad code entry to the knock-sensing lock 110. The monitoring system action can include providing an indication to the visitor that the keypad is enabled. For example, the action can include illuminating a green light, or displaying text including a message such as "Enter Code Now."

In some implementations, the monitoring system action can include controlling one or more devices at the property 102. For example, the monitoring system can include providing an instruction to one or more devices at the property to activate a doorbell chime, unlock the door, activate a camera to record images of the area near the door, or illuminate the area near the door.

In some implementations, the operations include selecting, from the at least one knocking pattern of the subset of knocking patterns, the knocking pattern having the greatest matching percentage; and based on the selected knocking pattern, performing the monitoring system action. For example, a threshold matching percentage may be 65%. The audio data may have a matching percentage with a first knocking pattern of 70%, and a matching percentage with a second knocking pattern of 84%. Thus, both the first knocking pattern and the second knocking pattern satisfy similarity criteria. The system can select the second knocking pattern as having the greatest matching percentage of 84%. Based on selecting the second knocking pattern, the system can perform the monitoring system action. The action performed for the first knocking pattern may be different from the action performed for the second knocking pattern. For example, for a match with the first knocking pattern, the system may perform a first action, e.g., of enabling the keypad. For a match with the second knocking pattern, the system may perform a second action, e.g., of unlocking the door.

In some implementations, each of the plurality of knocking patterns is associated with a user or group of users. For example, a knocking pattern may be associated with a group of users classified as "family," "friends," or "neighbors." In another example, a knocking pattern may be associated with a user such as "Bill," "Grandpa," or "Dog Walker."

The operations can include, in response to determining that the similarity between the audio data and stored audio data representing a knocking pattern satisfies similarity criteria, identifying a user or group of users based on the knocking pattern; and performing the monitoring system action based on identifying the user or group of users. For example, the system may identify that a detected knock satisfies criteria for matching the knocking pattern for the "family" user group. The system can perform the monitoring system action based on identifying the "family" user group. An action performed based on identifying the "family" user group may be different from an action performed based on identifying the "Dog Walker" user. For example, the action performed for the "family" user group may include, e.g., unlocking the door. The action performed for the "Dog Walker" user may include, e.g., sending a notification to a user device of a resident of the property indicating that the dog walker has arrived at the property.

In some implementations, the operations include: in response to determining that the similarity between the audio data and stored audio data representing the knocking pattern satisfies similarity criteria, identifying an event based on the knocking pattern; and performing the monitoring system action based on identifying the event. For example, a knocking pattern may be include corresponding data associating the knocking pattern with an event such as "returning from work," "delivery," or "duress." As an example, the system may determine that detected audio data satisfies similarity criteria with a knocking pattern associated with a delivery event. Based on matching the audio data with the knocking pattern associated with the delivery event, the system can perform a monitoring system action, e.g., of activating a doorbell chime or of sending a notification to a resident indicating that a delivery has occurred.

Figure 4:
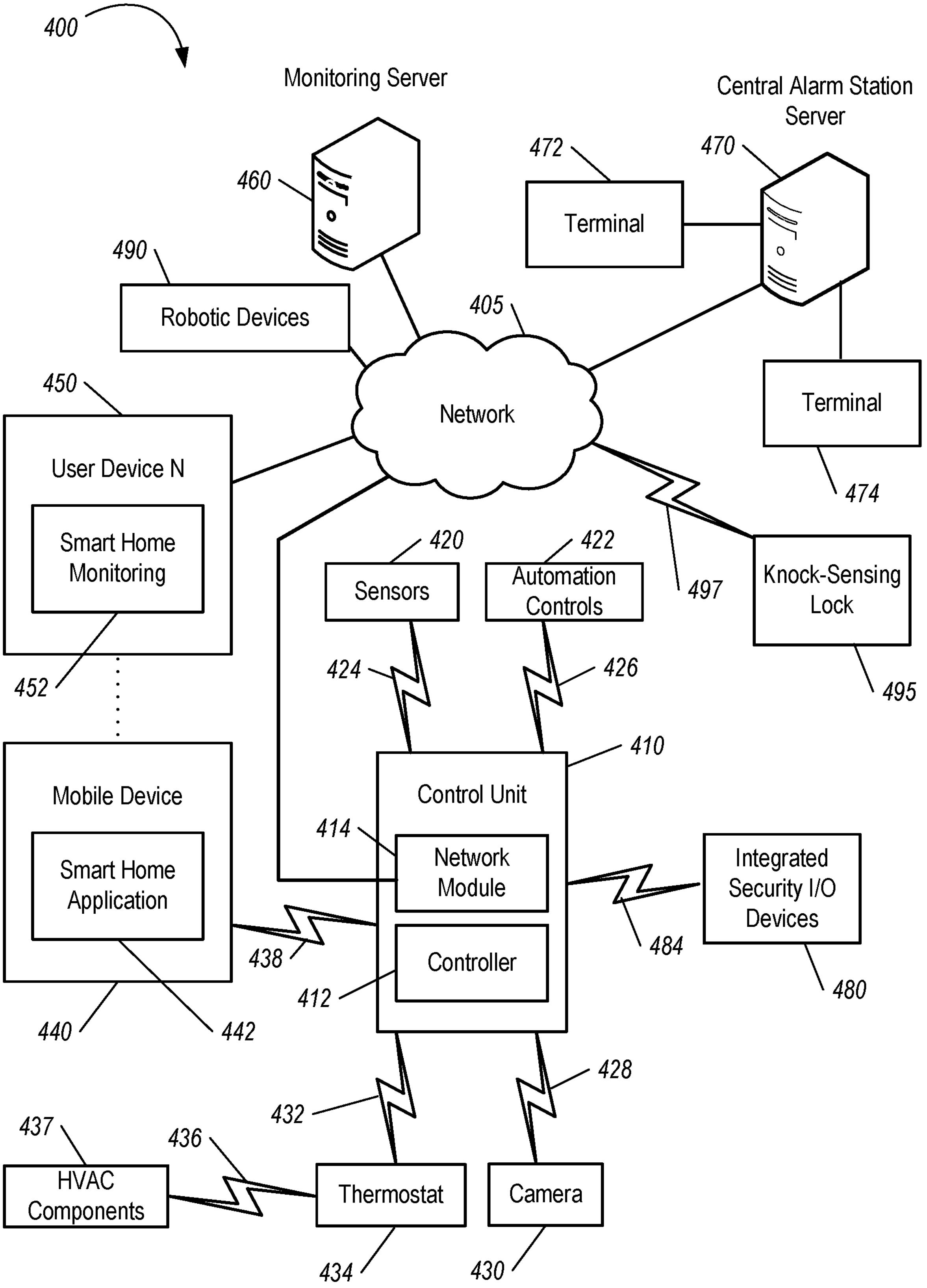
FIG. 4 is a diagram illustrating an example of a property monitoring system.

FIG. 4 is a diagram illustrating an example of a property monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a “normally open” or “normally closed” digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled “white” lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system “arming state”, or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller’s 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact-based charging stations and/or wireless charging stations. For contact-based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CATS) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400 (e.g., resident 106). For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The system 400 further includes a knock-sensing lock 495 in communication with the control unit 410 through a communication link 497, which similarly to as described above in regards to communication links 424, 426, 428, 432, 438, and 484, may be wired or wireless and include a local network. The knock-sensing lock 495 may be the knock-sensing lock 110, the control unit 410 may be the control unit 135, the sensors 420 may include the sensors 130, the automation controls 422 may include the porch light 114, and the monitoring server 460 may be the monitoring server 150.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system comprising one or more computers and one or more storage devices on which are stored instructions that are operable, when executed by the one or more computers, to cause the one or more computers to perform operations comprising:

maintaining, in memory, a plurality of first acoustic signatures each of which (i) represents a different pre-programmed acoustic signature representing a knocking pattern and (ii) has corresponding permissions that indicate allowed actions and an action criteria for performance of the action, at least a first permission for a first maintained acoustic signature from the plurality of first acoustic signatures indicating different allowed actions than a second permission for a second maintained acoustic signature from the plurality of first acoustic signatures;

receiving knock data that (i) was captured by a microphone and (ii) encodes a second acoustic signature representing a knock;

determining whether a similarity between any of the first acoustic signatures from the plurality of first acoustic signatures and the second acoustic signature satisfy a similarity criterion;

determining, as a matching first acoustic signature, the first acoustic signature for which the similarity criterion with the second acoustic signature is satisfied;

after determining the matching first acoustic signature, accessing the permissions for the matching first acoustic signature, the permissions indicating different allowed actions than other permissions for a different acoustic signature;

in response to determining the matching first acoustic signature, determining whether data for the knock data satisfies an action criterion for the permission for the matching first acoustic signature; and in response to determining whether the data for the knock data satisfies the action criterion for the permission for the matching first acoustic signature, performing a monitoring system action for the permission using data for the matching first acoustic signature.

2. The monitoring system of claim 1, wherein the second acoustic signature includes a characteristic of a sound from the knock, wherein determining whether a similarity between any of the first acoustic signatures from the plurality of first acoustic signatures and the second acoustic signature satisfy a similarity criterion comprises:

computing a difference between the characteristic of the sound from the knock and a characteristic of the matching first acoustic signature from the plurality of first acoustic signatures; and determining whether the difference between the characteristic of the sound from the knock and the characteristic of the matching first acoustic signature satisfies a threshold difference.

3. The monitoring system of claim 2, wherein the characteristic of the sound from the knock comprises one of a peak volume, an average frequency, a peak pulse amplitude, a time duration, a number of sound pulses, or a rest time between sound pulses of the sound from the knock.

4. The monitoring system of claim 1, wherein the second acoustic signature includes a time-varying parameter of a sound from the knock, wherein determining whether a similarity between any of the first acoustic signatures from the plurality of first acoustic signatures and the second acoustic signature satisfy the similarity criterion comprises:

computing a matching percentage between a time-varying parameter of the sound from the knock and a time-varying parameter of the matching first acoustic signature; and determining that the matching percentage exceeds a threshold matching percentage.

5. The monitoring system of claim 4, wherein the time-varying parameter of the sound from the knock comprises one of a time-varying amplitude or a time-varying frequency of the sound from the knock.

6. The monitoring system of claim 1, wherein determining whether a similarity between any of the first acoustic signatures from the plurality of first acoustic signatures and the second acoustic signature satisfy a similarity criterion comprises:

determining a value of a characteristic of the second acoustic signature selecting, for comparison with the second acoustic signature and from the plurality of first acoustic signatures, a subset of the plurality of first acoustic signatures using the value of a characteristic of each acoustic signature of the subset of the plurality of first acoustic signatures matches the value of the characteristic of the second acoustic signature within a programmed margin; and computing a matching percentage between a time-varying parameter of the second acoustic signature and a time-varying parameter of at least one acoustic signature of the subset of the plurality of first acoustic signatures; and determining, as the matching first acoustic signature, the first acoustic signature for which the similarity criterion with the second acoustic signature is satisfied comprises determining that the matching percentage between the time-varying parameter of the second acoustic signature and the time-varying parameter of at least one acoustic signature of the subset of the plurality of first acoustic signatures exceeds a threshold matching percentage.

7. The monitoring system of claim 6, wherein:

determining, as the matching first acoustic signature, the first acoustic signature for which the similarity criterion with the second acoustic signature is satisfied comprises selecting, from the at least one acoustic signature of the subset of the plurality of first acoustic signatures, an acoustic signature having the greatest matching percentage; and performing the monitoring system action uses the selected acoustic signature and corresponding permissions that indicate allowed actions.

8. The monitoring system of claim 1, the operations comprising:

obtaining, from a vibration sensor, vibration data indicating vibration of the knock; and determining, based on the vibration data, that a confidence level that the second acoustic signature represents a knock on a door exceeds a threshold confidence level; and in response to determining that the confidence level that the second acoustic signature represents a knock on the door exceeds the threshold confidence level, determining the similarity between the second acoustic signature and any of the plurality of first acoustic signatures.

9. The monitoring system of claim 1, wherein each of the plurality of first acoustic signatures is associated with a user or group of users, the operations comprising:

in response to determining that the similarity between the second acoustic signature and any of the plurality of first acoustic signatures satisfies similarity criteria, identifying one or more users based on the knocking pattern; and performing the monitoring system action using an identify of the one or more users.

10. The monitoring system of claim 1, the operations comprising:

in response to determining that the similarity between any of the first acoustic signatures from the plurality of first acoustic signatures and second acoustic signature satisfy the similarity criterion, identifying an event using the second acoustic signature; and performing the monitoring system action using the identified event.

11. The monitoring system of claim 1, wherein the monitoring system action includes enabling a keypad of a door lock.

12. The monitoring system of claim 11, wherein the microphone and door lock are integrated into a device.

13. The monitoring system of claim 1, wherein determining whether the similarity between any of the first acoustic signatures from the plurality of first acoustic signatures and the second acoustic signature satisfy the similarity criterion comprises:

computing a matching percentage between any of the first acoustic signatures from the plurality of first acoustic signatures and the second acoustic signature; and determining that the matching percentage satisfies a threshold matching percentage.

14. The monitoring system of claim 13, comprising accessing the threshold matching percentage that is a dynamic percentage that was determined using at least one of an arming status of the monitoring system or an occupancy of a property.

15. The monitoring system of claim 13, wherein the threshold matching percentage is based on an environmental condition at a property.

16. The monitoring system of claim 1, wherein:

the microphone and a proximity sensor are integrated into a device; and the operations comprise activating the microphone to detect a sound in response to receipt of a signal generated by the proximity sensor that indicates detection of movement.

17. The monitoring system of claim 1, wherein performing the monitoring system action comprises providing an instruction to one or more devices at a property to activate a doorbell chime, unlock a door, activate a camera to record images of an area comprising at least a portion of the door, or illuminate the area comprising at least the portion of the door.

18. The monitoring system of claim 1, wherein:

a first action criterion for a first permission, from the permissions that indicated allowed actions, comprises a time frame for allowed actions; and determining whether the permissions data for the knock data satisfies the action criterion for the first permission comprises determining whether a time at which the knock data is received satisfies the time frame for allowed actions.

19. A non-transitory computer-readable medium storing software comprising instructions executable by one or more computers which, upon such execution, cause the one or more computers to perform operations comprising:

maintaining, in memory, a plurality of first acoustic signatures each of which (i) represents a different pre-programmed acoustic signature representing a knocking pattern and (ii) has corresponding permissions that indicate allowed actions and an action criteria for performance of the action, at least a first permission for a first maintained acoustic signature from the plurality of first acoustic signatures indicating different allowed actions than a second permission for a second maintained acoustic signature from the plurality of first acoustic signatures;

receiving knock data that (i) was captured by a microphone and (ii) encodes a second acoustic signature representing a knock;

determining whether a similarity between any of the first acoustic signatures from the plurality of first acoustic signatures and the second acoustic signature satisfy a similarity criterion;

determining, as a matching first acoustic signature, the first acoustic signature for which the similarity criterion with the second acoustic signature is satisfied;

after determining the matching first acoustic signature, accessing the permissions for the matching first acoustic signature, the permissions indicating different allowed actions than other permissions for a different acoustic signature;

in response to determining the matching first acoustic signature, determining whether data for the knock data satisfies an action criterion for the permission for the matching first acoustic signature; and in response to determining whether the data for the knock data satisfies the action criterion for the permission for the matching first acoustic signature, performing a monitoring system action for the permission using data for the matching first acoustic signature.

20. A method for monitoring a property, the method comprising:

maintaining, in memory, a plurality of first acoustic signatures each of which (i) represents a different pre-programmed acoustic signature representing a knocking pattern and (ii) has corresponding permissions that indicate allowed actions and an action criteria for performance of the action, at least a first permission for a first maintained acoustic signature from the plurality of first acoustic signatures indicating different allowed actions than a second permission for a second maintained acoustic signature from the plurality of first acoustic signatures;

receiving knock data that (i) was captured by a microphone and (ii) encodes a second acoustic signature representing a knock;

determining whether a similarity between any of the first acoustic signatures from the plurality of first acoustic signatures and the second acoustic signature satisfy a similarity criterion;

determining, as a matching first acoustic signature, the first acoustic signature for which the similarity criterion with the second acoustic signature is satisfied;

after determining the matching first acoustic signature, accessing the permissions for the matching first acoustic signature, the permissions indicating different allowed actions than other permissions for a different acoustic signature;

in response to determining the matching first acoustic signature, determining whether data for the knock data satisfies an action criterion for the permission for the matching first acoustic signature; and in response to determining whether the data for the knock data satisfies the action criterion for the permission for the matching first acoustic signature, performing a monitoring system action for the permission using data for the matching first acoustic signature.

* * * * *